United States Patent Office 3,594,201
Patented July 20, 1971

3,594,201
ASPHALT EMULSIONS
Harry L. Sommer, Lafayette, and Charles C. Evans, Orinda, Calif., assignors to Shell Oil Company, New York, N.Y.
No Drawing. Filed Apr. 29, 1968, Ser. No. 725,187
Int. Cl. C08h 13/00; C08k 1/62; C09d 3/24
U.S. Cl. 106—277
5 Claims

ABSTRACT OF THE DISCLOSURE

Time stabilized, corrosion resistant anionic asphalt emulsions comprise a mixture consisting of 50 to 75% by weight asphalt and 25 to 50% by weight aqueous phase. The aqueous phase contains from 20 to 80 grams per liter of an emulgator containing specified amounts of ammonia or diammonium phosphate.

---

This invention relates to improved asphalt emulsions. More particularly this invention relates to time-stabilized, corrosion-resistant anionic asphalt emulsions.

It is known that slow-setting, alkaline, anionic asphalt emulsions capable of being mixed without coagulating with dry, finely graded aggregates are manufactured by emulsifying an asphalt with an emulgator consisting of dilute solutions of caustic saponified rosin derivatives and lignin derivatives. Saponified tall oil is also sometimes added as a part of the emulgator system.

A recurring complaint with these emulsions is that they form pellets on standing. These pellets can be an inch or larger in diameter and tend to plug valves, pumps and spray nozzles thereby rendering the emulsion useless.

The slow-setting asphalt emulsions, like other asphalt emulsions, are stored and shipped in mild steel tanks or drums, often being held in these containers for considerable periods of time. These emulsions have been considered to be noncorrosive toward mild steel, but tests have shown that the sodium lignate component is reactive toward steel and this reactivity is not overcome by the saponified rosin derivative or tall oil soap.

Pellets may form due to excessive amounts of polyvalent metal ions such as calcium and magnesium or even by temperature cycling. It has been observed that large pellets may be formed by the emulsion being electrophoretically deposited at the site of an active corrosion cell. In practice the emulsion is manufactured at the emulsion plant and shipped to the point of use. During transfer and shipping, which is most often done at temperatures of 120–140° F. these electrophoretically deposited pellets or "boils" become dislodged into the bulk of the emulsion.

The presence of these pellets or boils in the emulsion is often the cause of the failure of these emulsions to pass specifications, such as those imposed by the Asphalt Institute, ASTM and State and Federal agencies, thereby causing the rejection of the emulsions. These emulsions must then be discarded or filtered in a manner as to get rid of the pellet-like particles that have been formed.

Another disadvantage of anionic asphalt emulsions has been their inabiilty to remain stable over an extended period of time, especially during freeze-thaw type conditions. Thus the inability of emulsions to be stable during the prolonged storage has resulted in a rejection in many instances. For example, it would be desirable to have the storage stability improved where anionic asphalt emulsion could be of use to a contractor faced with winter shutdowns or delays due to inclement weather, strikes and other interruptions.

It has now been found that the above problems relating to time storage instability, pellet formation and corrosion can be substantially or completely eliminated by the compositions of this invention.

These emulsion compositions comprise an asphalt or solids content of about 50 to 75% by weight and an aqueous phase of about 25 to 50% by weight. The aqueous phase contains about 20 to 80 grams per liter of an emulgator consisting of a lignin derivative, a saponified rosin derivative, an alkali metal hydroxide and a nitrogen base selected from the group consisting of ammonia and diammonium phosphate.

These asphalt emulsions are noncorrosive toward mild steel and have been shown to be stable over considerable periods of time, including numerous freeze-thaw cycles. When the nitrogen base is added in sufficient quantities, there is also little or no pellet or boil formation within the emulsion.

An additional advantage gained in the addition of the specified nitrogen bases to the emulsions is that vapor-space corrosion above the emulsion has been substantially or completely eliminated.

While it is not known why the addition of ammonia or diammonium phosphate inhibits corrosion or pellet formation, it is known that this is not a function of pH or ion strength as will subsequently be shown. It is, however, important that the ammonia or diammonium phosphate be present above a certain minimum concentration. In general, concentrations of from about 0.04 to about 0.8% by weight basis emulsion are acceptable. For ammonia the preferred concentration range has been found to be from about 0.06 to about 0.20% by weight basis emulsion with amounts of about 0.12% being especially preferred. When using diammonium phosphate the effective concentration has been found to be about 0.2 to about 0.6%. The ammonia or diammonium phosphate may be added to the emulgator prior to emulsification or may be added to the emulsion.

The particular type of asphalt does not appear to be critical. The asphalt is preferably present in the emulsion in amounts from about 50–75% by weight.

The aqueous phase comprises about 25–50% by weight of the emulsion. The emulsifiers and additives are present in the aqueous phase in an amount varying from about 20–80 grams per liter. As used herein the term "emulgator" is that solution which contains all of the substances added to the water. This includes the emulsifiers stabilizers, and other additives including the caustic or acid required to form the soaps which are actually used to emulsify the asphalt. In general the emulsifying and stabilizing additives comprise a saponified rosin and a lignin derivative. The saponified rosin is made from dark colored rosin acids which are substantially insoluble in $C_6$–$C_{10}$ aliphatic hydrocarbons. Typical of these rosin acids are those available under the trade name Vinsol from Hercules Inc and may be saponified by the addition of an alkali metal hydroxide. This saponified rosin functions as a primary emulsifier. The secondary emulsifier and/or stabilizer is a lignin derivative recovered as a by-product from paper manufacture. Exemplary are the sodium lignates and lignosulfonate derivatives. The sodium lignates may be obtained under the trade name Indulin-C from West Virginia Pulp and Paper Company. Other additives such as saponified tall oil may also be present in the emulgator. The nitrogen base may be considered as part of the emulgator system since it is present in the aqueous phase; however, it does not contribute to the emulsifying part of the package. A stronger base such as sodium hydroxide is required to saponify the rosin acids.

It is the lignin derivative that has been shown to act as the corrosion promoter in the emulsions and, therefore, its concentrations should be kept as low as feasible. In general, the ratio of saponified rosin to lignin derivative is from 1:1 to about 3:1 with a ratio of 2:1 being preferred.

This invention will now be further described with reference to the following examples.

EXAMPLE I

Mild steel strips with bright cut edges were placed in polyethylene bottles containing emulsion consisting of about 57–60% by weight of asphalt. The emulgator had a saponified rosin to sodium lignate content of about 1.25:1 to 2:1. The volume of area ratio of the emulsion to the steel was approximately the same as those found in practice in mild steel tanks. The emulsions were subjected to cycles of 16 hours heating at 130° F. and 8 hours cooling at 40° F. The bottles were loosely capped to allow breathing of the contents. Some emulsions undergoing the tests in the presence of steel strips had 0.15% by weight ammonia added to them. The steel strips placed in emulsions without ammonia were in every case corroded in the vapor phase and had boils of asphalt electrophoretically deposited just below the air/liquid phase and at the point of contact of the strip at the bottom of the bottle. In some insances the boils broke loose and were found on the U.S. Standard 20 mesh screen residue. When the ammonia was present, no vapor phase corrosion occurred, boils were absent and the amount retained on the screen was greatly reduced.

EXAMPLE II

In order to determine the effect of different ammonia concentrations the following runs were made. To an emulsion comprising 57% by weight asphalt and an aqueous phase having an emulgator concentration of about 40 grams/liter (saponified rosin to sodium lignate ratio of 2:1) was added sufficient ammonia to bring the emulsion to an ammonium concentration of 0.06%–0.20% by weight. These emulsions were compared to an emulsion having no ammonia added. The emulsions were added to a steel cylinder which was capped and placed on a rolling apparatus for 60 hours at a temperature of 76° F. At the end of these runs, the emulsions were passed through a given series of screens (U.S. Standard) varying from 20 to 200 mesh and the percent of material retained on a given screen are given in Table I below.

TABLE I

| | Run number | | |
|---|---|---|---|
| | 1 | 2 | 3 |
| Percent $NH_3$ | 0.20 | 0.06 | 0.00 |
| Percent cumulative solids retained— mesh screen: | | | |
| 20 | 0.0004 | 0.002 | 0.110 |
| 60 | 0.0020 | 0.0035 | 0.114 |
| 100 | 0.0048 | 0.034 | |
| 200 | 0.013 | 0.042 | |
| Appearance of steel cylinder | (1) | (2) | (3) |

[1] No "boils"; bright metal.
[2] One small "boil"; some stain.
[3] Many "boils"; black spots.

EXAMPLE III

To demonstrate the effect of diammonium phosphate and also to show that the stabilizing and inhibiting functions of the anionic asphalt are not a function of pH or ion strength, the following runs were made. The emulsion comprised about 57% by weight of asphalt and an emulgator which contained 20 grams per liter or rosin acid, 12 grams per liter of sodium lignate, 4.1 grams per liter of tall oil and 4.6 grams per liter of sodium hydroxide as a saponifying agent. The emulsions were subjected to a rolling test in a steel cylinder for 66 hours at an r.p.m. of 60 and at a temperature of 68–80° F. Various additives and emulsions are shown below in Table II.

TABLE II

| | Run Number | | | | | | |
|---|---|---|---|---|---|---|---|
| | 4 | 5 | 6 | 7 | 8 | 9 | 10 |
| Additive number: | | | | | | | |
| 1 | None | $NH_3$ | $NH_3$ | $NH_4Cl$ | $NH_4Cl$ | $(NH_4)_2HPO_4$ | NaCl |
| 2 | do | None | None | None | NaOH | None | None. |
| Weight percent number: | | | | | | | |
| 1 | do | 0.06 | 0.20 | 0.189 | 0.189 | 0.234 | 0.207. |
| 2 | do | 0.00 | 0.00 | 0.00 | 0.133 | 0.00 | 0.00. |
| Mmols/liter number: | | | | | | | |
| 1 | do | 35.3 | 118 | 35.3 | 35.3 | 17.7 | 35.4. |
| 2 | do | 0.00 | 0.00 | 0.00 | 33.3 | 0.00 | 0.00. |
| Meq. $NH_3$/liter | 0.00 | 35.3 | 118 | 35.3 | 35.3 | 35.4 | 0.00. |
| pH | 11.65 | | | 9.60 | 11.25 | 9.75 | 11.52. |
| Sieve analysis; weight percent retained on: | | | | | | | |
| 20 mesh (841 micron) | 0.110 | 0.0020 | 0.0004 | 0.056 | 0.114 | 0.0011 | 0.0231. |
| 60 mesh (250 micron) | 0.114 | 0.0035 | 0.0024 | 0.057 | 0.118 | 0.0015 | 0.0331. |
| 100 mesh (149 micron) | 0.0340 | 0.0048 | 0.086 | 0.123 | 0.0050 | 0.0476. | |
| 200 mesh (74 micron) | 0.0420 | 0.013 | 0.136 | 0.142 | 0.013 | 0.057. | |
| Boils formed | Yes | Trace | No | Yes | Yes | No | Yes. |

From the above data it is evident that the emulsions containing ammonium chloride and sodium chloride did not function in inhibiting boil formation and are, therefore, outside the scope of the invention. It is also evident from the above that the addition of sodium hydroxide or ionic materials, such as sodium chloride, does not effectively inhibit corrosion or boil formation and, therefore, the addition of the ammonia or diammonium phosphate is not a function of pH or ion concentration.

EXAMPLE IV

To show the storage stability of the emulsions of this invention, the following emulgators were made.

TABLE III

| | Pounds/1,000 gallons | | | | | |
|---|---|---|---|---|---|---|
| | $NH_3$ 26° Be aqueous | Saponified resin [1] | Sodium lignate [2] | Tall oil | NaOH | pH |
| Run Number: | | | | | | |
| 11 | None | 125 | 100 | 35 | 16 | 9.3 |
| 12 | do | 167 | 83 | None | 25 | 10.7 |
| 13 | 100 | 167 | 83 | do | 26 | 10.9 |

[1] Vinsol resin—Hercules.
[2] Indulin-C—West Virginia Pulp and Paper Company.

The above emulgators were used to prepare emulsions having a residue of about 60% by weight. These emulsions were stored for a period of eight months and passed through various freeze-thaw cycles after which they were examined. The emulsion from Run No. 11 was gelled, had a putrid odor and was not stable to three freeze-thaw cycles to —20° F. The emulsion from Run No. 12 was lumpy and likewise was not stable to three freeze-thaw cycles to —20° F. On the other hand, the emulsion from Run No. 13 was smooth with only slight settlement and was stable after three freeze-thaw cycles to —20° F. with warming to room temperature.

The above shows that the emulsions of this invention are not only storage stable but are capable of passing through various freeze-thaw cycles which would render them useful to the contractor who must store emulsions over a considerable period of time and under various conditions.

We claim as our invention:

1. An asphalt emulsion comprising 50–75% by weight asphalt and 50–25% by weight of an aqueous phase containing 2–6% by weight emulgator comprising saponified rosin acid and lignin, said emulgator containing 0.04 to 0.8% by weight basis emulsion of ammonia.

2. The composition of claim 1 wherein the lignin is sodium lignate and the ratio of the saponified rosin acid to lignin is 1:1 to 3:1.

3. The composition of claim 2 wherein the concentration of ammonia is from about 0.06 to 0.2% by weight.

4. The composition of claim 3 wherein the saponified rosin acids to lignin ratio is about 2:1.

5. The composition of claim 3 wherein the aqueous phase has a pH of about 10.5 at 25° C.

References Cited

UNITED STATES PATENTS

| | | | |
|---|---|---|---|
| 2,615,851 | 10/1952 | Manzer | 106—277X |
| 2,858,230 | 10/1958 | Knoll et al. | 106—277 |

JULIUS FROME, Primary Examiner

J. B. EVANS, Assistant Examiner

U.S. Cl. X.R.

106—14; 252—311.5, 388